United States Patent
Kim et al.

(10) Patent No.: US 11,487,953 B2
(45) Date of Patent: Nov. 1, 2022

(54) METHOD AND APPARATUS WITH NATURAL LANGUAGE PROCESSING

(71) Applicant: Samsung Electronics Co., Ltd., Suwon-si (KR)

(72) Inventors: Misuk Kim, Seoul (KR); Sanghyun Yoo, Seoul (KR); Jeong-Hoon Park, Seoul (KR); Jehun Jeon, Suwon-si (KR); GyuBum Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 16/872,723

(22) Filed: May 12, 2020

(65) Prior Publication Data

US 2021/0150155 A1 May 20, 2021

(30) Foreign Application Priority Data

Nov. 19, 2019 (KR) .................. 10-2019-0148984

(51) Int. Cl.
*G06F 40/56* (2020.01)
*G06F 40/268* (2020.01)
(Continued)

(52) U.S. Cl.
CPC .......... *G06F 40/56* (2020.01); *G06F 16/3329* (2019.01); *G06F 16/3344* (2019.01);
(Continued)

(58) Field of Classification Search
CPC ............. G06F 16/3329; G06F 16/3344; G06F 16/90332; G06F 40/205; G06F 40/268;
(Continued)

(56) References Cited

U.S. PATENT DOCUMENTS 6,687,689 B1 * 2/2004 Fung ................. G06F 16/3338
6,859,800 B1 * 2/2005 Roche ............... G06F 16/3334
707/723
(Continued)

FOREIGN PATENT DOCUMENTS

JP 2011-18327 A 1/2011
KR 10-2018-0114537 A 10/2018
(Continued)

OTHER PUBLICATIONS

Extended European Search Report dated Feb. 11, 2021 in counterpart European Patent Application No. 20191978.4 (8 pages in English).
(Continued)

*Primary Examiner* — Eric Yen
(74) *Attorney, Agent, or Firm* — NSIP Law (57) ABSTRACT

A method and apparatus with natural language processing is disclosed. The method includes determining a first similarity between an input sentence of a user and a select first database query sentence and dependent on a determination that the first similarity fails to meet a first threshold, determining a second similarity between a portion of the input sentence, less than all of the input sentence, and a select second database query sentence, and in response to the second similarity meeting a second threshold, outputting a response sentence corresponding to the second database query sentence as a response to the input sentence.

28 Claims, 8 Drawing Sheets

(51) Int. Cl.
*G06F 40/205* (2020.01)
*G06F 40/30* (2020.01)
*G10L 15/18* (2013.01)
*H04L 51/02* (2022.01)
*G06F 16/9032* (2019.01)
*G06F 16/332* (2019.01)
*G06F 16/33* (2019.01)

(52) U.S. Cl.
CPC ...... *G06F 16/90332* (2019.01); *G06F 40/205* (2020.01); *G06F 40/268* (2020.01); *G06F 40/30* (2020.01); *G10L 15/1822* (2013.01); *H04L 51/02* (2013.01)

(58) Field of Classification Search
CPC ......... G06F 40/30; G06F 40/56; H04L 51/02; G10L 15/1822; G10L 15/22
See application file for complete search history.

(56) References Cited

U.S. PATENT DOCUMENTS

| | | | |
|---|---|---|---|
| 10,162,816 | B1 | 12/2018 | Banerjee et al. |
| 11,151,191 | B2 * | 10/2021 | Hsieh ............... H04N 21/26603 |
| 11,256,691 | B1 * | 2/2022 | Huang ................. G06F 16/248 |
| 2004/0205737 | A1 * | 10/2004 | Margaliot ............. G06F 40/211 |
| | | | 717/143 |
| 2012/0303358 | A1 * | 11/2012 | Ducatel .................. G06F 40/30 |
| | | | 704/9 |
| 2015/0058059 | A1 * | 2/2015 | Kahan .................. G06F 3/0482 |
| | | | 705/7.19 |
| 2015/0161271 | A1 * | 6/2015 | Gur .................... G06F 16/9537 |
| | | | 707/728 |
| 2016/0124936 | A1 * | 5/2016 | Wang ...................... G06F 40/30 |
| | | | 704/9 |
| 2016/0196360 | A1 * | 7/2016 | Best ................. G06F 16/24522 |
| | | | 707/722 |
| 2017/0278416 | A1 * | 9/2017 | Liu .......................... G09B 7/00 |
| 2019/0065506 | A1 | 2/2019 | Li et al. |
| 2019/0180258 | A1 | 6/2019 | Amar et al. |
| 2019/0206397 | A1 | 7/2019 | Zhou |
| 2019/0251165 | A1 | 8/2019 | Bachrach et al. |
| 2019/0260694 | A1 | 8/2019 | Londhe et al. |
| 2019/0317955 | A1 | 10/2019 | Zhelezniak et al. |
| 2019/0354630 | A1 * | 11/2019 | Guo ....................... G10L 15/08 |

FOREIGN PATENT DOCUMENTS

| | | |
|---|---|---|
| KR | 10-2019-0066988 A | 6/2019 |
| KR | 10-2019-0075711 A | 7/2019 |
| KR | 10-2019-0080599 A | 7/2019 |

OTHER PUBLICATIONS

Yan, R et al., "Learning to Respond with Deep Neural Networks for Retrieval-Based Human-Computer Conversation System", *Proceedings of the 39th International ACM SIGIR Conference on Research and Development in Information Retrieval*, Jul. 2016, pp. 55-64 (10 pages in English).

Zhou, X et al., "Multi-View Response Selection for Human-Computer Conversation", *Proceedings of the 2016 Conference on Empirical Methods in Natural Language Processing*, Nov. 2016, pp. 372-381 (10 pages in English).

Wu, Y et al., "Sequential Matching Network: A New Architecture for Multi-Turn Response Selection in Retrieval-Based Chatbots", arXiv:1612.01627v2, May 15, 2017, pp. 1-10 (10 pages in English).

Zhou, X et al., "Multi-Turn Response Selection for Chatbots with Deep Attention Matching Network", *Proceedings of the 56th Annual Meeting of the Association for Computational Linguistics (Long Papers)*, Jul. 2018, pp. 1118-1127 (10 pages in English).

* cited by examiner

| Input sentence | Full sentence matching query sentence | Response sentence | Portion of input sentence | Sentence partial matching query sentence | Response sentence |
|---|---|---|---|---|---|
| Sad because World Cup is over | World Cup is coming | I wonder what country will win this time | Sad | Sad | That sounds really sad |
| Trouser do not fit in | Did you try trousers on | I rarely wear it, but my taste is skinny jean. | Not fit in | Not fit in | Oops… we should check why |
| I want to go Hawaii | I want to go eat raw octopus | Um… I want to try it too | Want to go | Want to go | I feel so |
| Wanna eat Mulnaeng or eat Binaeng | I want to go eat some water | Then, go eat glass of water! | Eat, eat | Eat | I'm getting full even just looking at |
| What Kaya Jam is made of | You are upsetting me | I didn't mean it | What made of | How to make | Bixby is being upgraded every day! You'll get answer next time |

FIG. 4

| Input sentence | Full sentence-based retrieval model | Full/partial sentence-based retrieval model | Selection model (retrieval model + generation model) |
|---|---|---|---|
| I have no friend | There are many friends crazy about Bixby | Step closer to whom you want to be friendly with and share your heart | Step closer to whom you want to be friendly with and share your heart |
| Have you had Baumkuchen | Patting and petting | Yum yum | No, but I wish I would have a chance to try it |
| Wanna eat brownies | Yes I will | I guess I was sleepy when I learned that question. I will study more. | You're not on a diet right now, are you? |
| Fine dust seems severe today | That's nice | That's interesting question | Wear a mask |
| I like Injeolmi best | See | Me too! | Me too! |
| Can I make it? | Yes, here! | I am always cheering for you | I am always cheering for you |
| Pyeongyang Naengmyeon is delicious | Therefore exists | I wonder what it will taste like! | I wonder what it will taste like! |

METHOD AND APPARATUS WITH NATURAL LANGUAGE PROCESSING

CROSS-REFERENCE TO RELATED APPLICATIONS

This application claims the benefit under 35 USC § 119(a) of Korean Patent Application No. 10-2019-0148984 filed on Nov. 19, 2019 in the Korean Intellectual Property Office, the entire disclosure of which is incorporated herein by reference for all purposes.

BACKGROUND

1. Field

The following description relates to a method and apparatus with natural language processing.

2. Description of Related Art

A chatbot system is a system for generating a response sentence corresponding to a sentence input by a user. Chatbot systems may include a retrieval model-based chatbot system and a generation (or generative) model-based chatbot system. Since the retrieval model-based chatbot system is based on data stored in a database, it is difficult to output a response sentence suitable for an input sentence or phrasing that is not already included in the database. The generation model-based chatbot system generates various responses. However, the generation model-based chatbot system is often inconsistent because it may generate a grammatically incorrect response or generates different responses to the same query input at different times.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes determining a first similarity between an input sentence of a user and a select first database query sentence, and dependent on a determination that the first similarity fails to meet a first threshold, determining a second similarity between a portion of the input sentence, less than all of the input sentence, and a select second database query sentence, and in response to the second similarity meeting a second threshold, outputting a response sentence corresponding to the second database query sentence as a response to the input sentence.

The method may further include encoding the input sentence into a first feature vector, where the determining of the first similarity may include determining a similarity between the first feature vector and the first database query sentence, the first database query sentence being a first query sentence feature vector stored in a database among a plurality of query sentence feature vectors stored in the database.

The method may further include, dependent on the determination that the first similarity fails to meet the first threshold, encoding the portion of the input sentence into a second feature vector, where the determining of the second similarity may include determining a similarity between the second feature vector and the second database query sentence, the second database query sentence being a second query sentence feature vector stored in the database.

The outputting of the response sentence corresponding to the second database query sentence may include decoding the second query sentence feature vector to obtain the response sentence.

The portion of the input sentence may be one component of plural components included in the input sentence.

The portion of the input sentence may be a verb, as the one component, included in the input sentence.

The portion of the input sentence may be a sentence component selected based on a type of task, of plural types of tasks, the input sentence corresponds to.

The plural types of tasks may include a chatbot type and a retrieval type.

Apportionment of the input sentence, to determine the portion of the input sentence, may be based on a performed morpheme analysis for the input sentence.

The method may further include outputting, based on the first similarity meeting the first threshold, a response sentence corresponding to the first query sentence as the response to the input sentence.

The method may further include generating, when the second similarity fails to meet the second threshold, a response sentence corresponding to the input sentence using a generation model, and outputting the generated response sentence.

The input sentence of the user may be acquired from a speech uttered by the user or text data input by the user.

In a general aspect, non-transitory computer-readable storage media stores instructions that, when executed by one or more processors, causes the one or more processors to perform one or more or any combination thereof of all processes described herein.

In a general aspect, a processor-implemented method includes selecting a component from among all components included in an input sentence of a user, determining a similarity between the selected component and a select database stored query sentence, and selectively outputting, based on whether the similarity meets a threshold, a response sentence corresponding to the database stored query sentence as a response of the input sentence.

The selecting of the component may include selecting the component corresponding to a type of task that the input sentence is being processed for the selective outputting of the response sentence as the response to the input sentence.

The selecting of the component corresponding to a type of task may include determining the type of the task, from among a plurality of task types including at least a chatbot type and retrieval type, and based on a result of the determining of the type of the task selecting between a noun and verb of the input sentence to be the selected component.

The selecting of the component may include performing a morpheme analysis on the input sentence, and selecting the component dependent on a result of the performed morpheme analysis.

The method may further include generating, when the similarity fails to meet the threshold, a response sentence corresponding to the input sentence using a generation model, and outputting the generated response sentence as the response of the input sentence.

The method may further include encoding the component into a first feature vector, where the determining of the similarity may include determining a similarity between the first feature vector and a component feature vector stored in a database among a plurality of component feature vectors stored in the database.

The method may further include determining whether to perform the selecting of the component, the determining of the similarity, and the selective outputting based on whether an initial similarity determination, between an encoding result of the input sentence and select stored database query encoding results, meets an initial threshold.

When the similarity meets the threshold, the selective outputting of the response sentence corresponding to the database query sentence may include decoding the first feature vector and outputting the decoded first feature vector as the response sentence.

In a general aspect, an apparatus includes one or more processors configured to determine a first similarity between an input sentence of a user and a select first database query sentence, and, dependent on a determination that the first similarity fails to meet a first threshold, determine a second similarity between a portion of the input sentence, less than all of the input sentence, and a select second database query sentence, and in response to the second similarity meeting a second threshold, output a response sentence corresponding to the second database query sentence as a response to the input sentence.

The portion of the input sentence may be one component of plural components included in the input sentence.

The portion of the input sentence may be a verb, as the one component, included in the input sentence.

The portion of the input sentence may be a sentence component selected based on a type of task, of plural types of tasks, the input sentence corresponds to.

The plural types of tasks may include a chatbot type and a retrieval type.

Apportionment of the input sentence, to determine the portion of the input sentence, may be based on a performed morpheme analysis for the input sentence.

In a general aspect, an apparatus includes one or more processors configured to output a first response sentence corresponding a first database query sentence that has a similarity with an input sentence of a user that meets a first threshold, and output a second response sentence corresponding to a second database query sentence that has a similarity with a select portion of the input sentence that meet a second threshold.

The one or more processors may be further configured to select between outputting the first response and outputting the second response, and based on the selection between the outputting of the first response and the outputting of the second response output only one of the first response and the second response.

The one or more processors may be further configured to generate a third response sentence by using a generation model with respect to the input sentence, and configured to output the generated third response sentence.

The one or more processors may be further configured to select between outputting the first response, outputting the second response, and outputting the third response, and based on the selection between the outputting of the first response, the outputting of the second response, and the outputting of the third response output only one of the first response, the second response, and the third response.

The one or more processors may be further configured to determine whether the similarity of the first database query sentence, as a select first database query sentence found to be most similar to the input sentence from among plural database query sentences, with the input sentence meets the first threshold, and configured to not output the first response sentence when the similarity of the first database query sentence with the input sentence fails to meet the first threshold.

The one or more processors may be further configured to determine whether the similarity of the second database query sentence, as a select second database query sentence found to be most similar to the select portion of the input sentence, with the input sentence meets the second threshold, and configured to not output the second response sentence when the similarity of the second database query sentence with the select portion of the input sentence fails to meet the second threshold.

The one or more processors may be further configured to generate a third response sentence by using a generation model with respect to the input sentence, and configured to output the generated third response sentence when the similarity of the second database query sentence with the select portion of the input sentence fails to meet the second threshold.

The one or more processors may be further configured to encode the input sentence into a first feature vector, and determine whether the similarity of the first database query sentence with the input sentence meets the first threshold by determining a similarity between the first feature vector and a first query sentence feature vector, corresponding to the first database query sentence, stored in a database among a plurality of query sentence feature vectors stored in the database.

The one or more processors may be further configured to encode the select portion of the input sentence into a second feature vector, and determine whether the similarity of the second database query sentence with the select portion of the input sentence meets the second threshold by determining a similarity between the second feature vector and a second query sentence feature vector, corresponding to the second database query sentence, stored in a database among a plurality of query sentence feature vectors stored in the database.

The select portion of the input sentence may be a select one component of plural components included in the input sentence.

The select portion of the input sentence may be a verb, as the one component, included in the input sentence.

The one or more processors may be further configured to select less than all components of the input sentence, as the select portion of the input sentence, based on a type of task being performed by the one or more processors with respect to the input sentence, the type of the task being a task from among a plurality of task types including at least a chatbot type and retrieval type.

The selecting of the less than all components of the input sentence may include differently selecting between inclusion of a verb and noun, respectively in the input sentence, to determine the select portion of the input sentence.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

An apparatus with natural language processing (hereinafter, also referred to as "natural language processing apparatus") determines, among other things, a response sentence to a sentence input from a user and includes, for example, a chatbot system. When determining the response sentence, the natural language processing apparatus uses a retrieval model and/or a generation model. The generation model may also be referred to as a generative model. The retrieval model retrieves a query sentence determined most similar to an input sentence of the user using a database or other resource library in which numerous pairs of query sentences and response sentences have been previously collected and matched, and outputs a response sentence corresponding to the retrieved query sentence as a response to the input sentence. Contrastingly, the generation model may be a machine learning trained model, for example, having been trained based on a large quantity of data with the objective to generate a most appropriate response sentence for a sentence input to the model. Hereinafter, in accordance with one or more embodiments, processes of determining a response sentence selectively using one or more retrieval models, or selectively using one or more retrieval models and a generation model, in the natural language processing apparatus will be described in greater detail.

Figure 1:
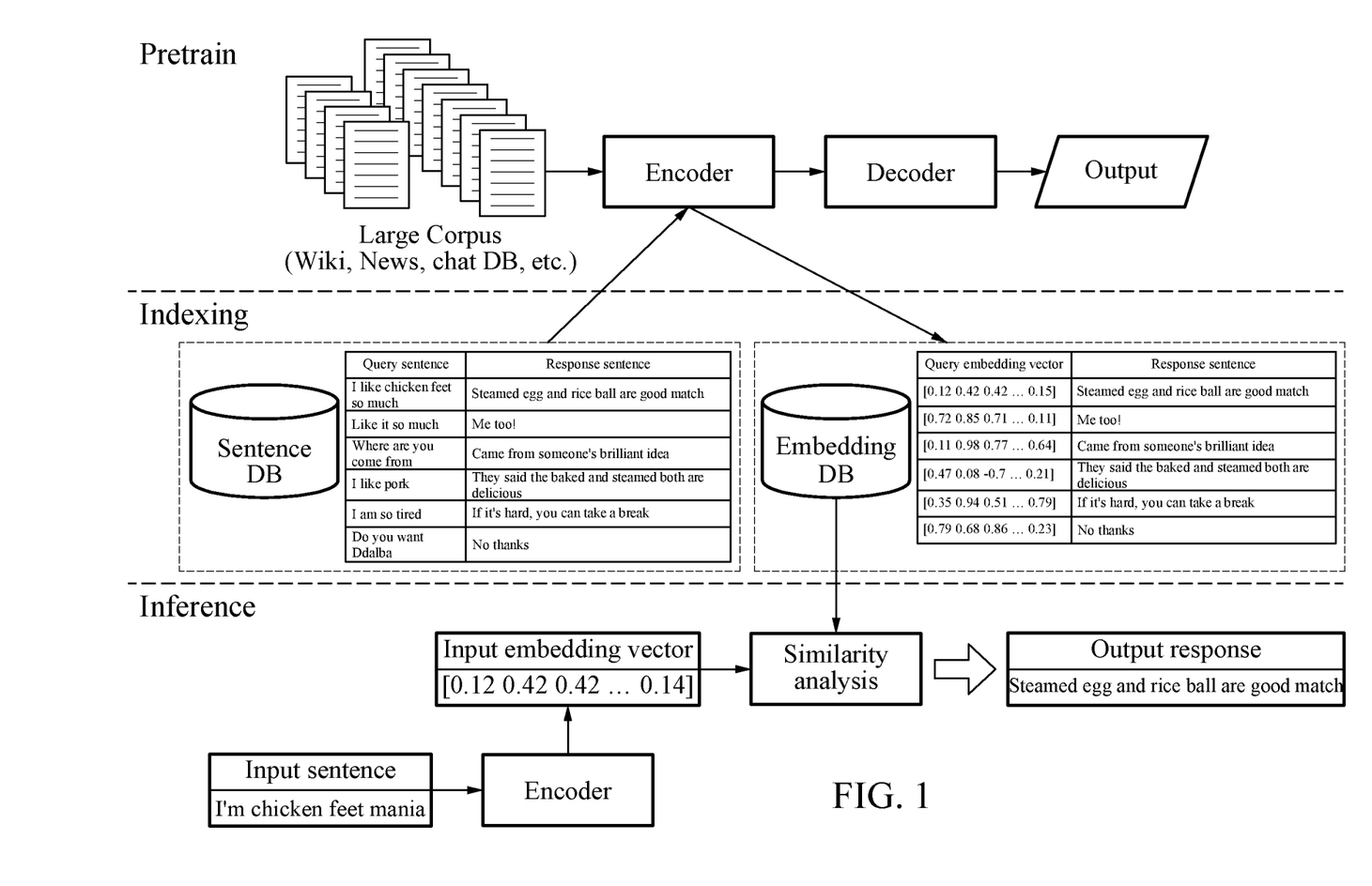
FIG. 1 illustrates an example process of determining a response sentence using a retrieval model, according to one or more embodiments.

FIG. 1 illustrates a process of determining a response sentence using a retrieval model, according to or more embodiments.

For example, FIG. 1 illustrates examples of pretraining, indexing, and inferencing processes.

In the example pretraining process, an encoder and a decoder are trained based on various collected corpus data. For example, when the corpus data used for learning is wiki data, such as from sites of or supported by wikidata.org or other public and/or private sources, a present sentence and a next sentence in a conversation may constitute a learning data pair. The encoder and the decoder may be trained such that the encoder outputs a feature vector, e.g., an embedding vector, of the present sentence as context information when the present sentence is input to the encoder and the decoder may be trained to output the next sentence using the context information. Also, when the corpus data used for learning is a form of a question and an answer, the question and the answer may constitute a learning data pair. Likewise, with such a question and answer learning data pair, the encoder and the decoder may be trained such that the decoder outputs the answer when the question is input to the encoder.

In the example indexing process, an embedding vector conversion using the pretrained encoder may be performed. A sentence database may be used/generated/updated to store numerous pairs of query sentences and response sentences.

Here, for each of the query sentences an embedding vector may be acquired using the encoder to which the respective query sentence was input. An embedding database may thus be used/generated/updated to store numerous pairs of such query embedding vectors and the corresponding response sentences, e.g., where the stored response sentences may be considered to be respective decodings of the stored query embedding vectors.

In the example inferencing process, a sentence input from a user is converted into an input embedding vector using the encoder. A similarity between the input embedding vector and each of a plurality of query embedding vectors stored in the embedding database is determined. One or more query embedding vectors having the highest similarities with the input embedding vector may be determined, so that a respective response sentence corresponding to a determined query embedding vector may be determined. The determined response sentence may then be output as a response to the input sentence of the user.

As such, when a sentence is input from the user, a response sentence may be determined based on a determined similarity between a full input sentence and a found query sentence stored in a database, e.g., by comparing an output embedding vector from the encoder to query embedding vectors stored in the embedding database. A most similar query embedding vector may be determined, and from that a response sentence determined for the full input sentence. When the determined similarity, resulting from the comparing and with respect to the determined most similar query embedding vector, is less than, or fails to meet, a first threshold, the input sentence may be determined to not be similar to any of the query sentences represented by query embedding vectors in the embedding database. In this case, the determined response sentence would not be appropriate as a response to the input sentence. Thus, it may be necessary to retrieve another response sentence from the database that is more appropriate by determining a similarity based on another criterion or generate a response sentence using a generation model, i.e., a generative model. Related further description will be made with reference to FIGS. 2 and 3.

Figure 2:
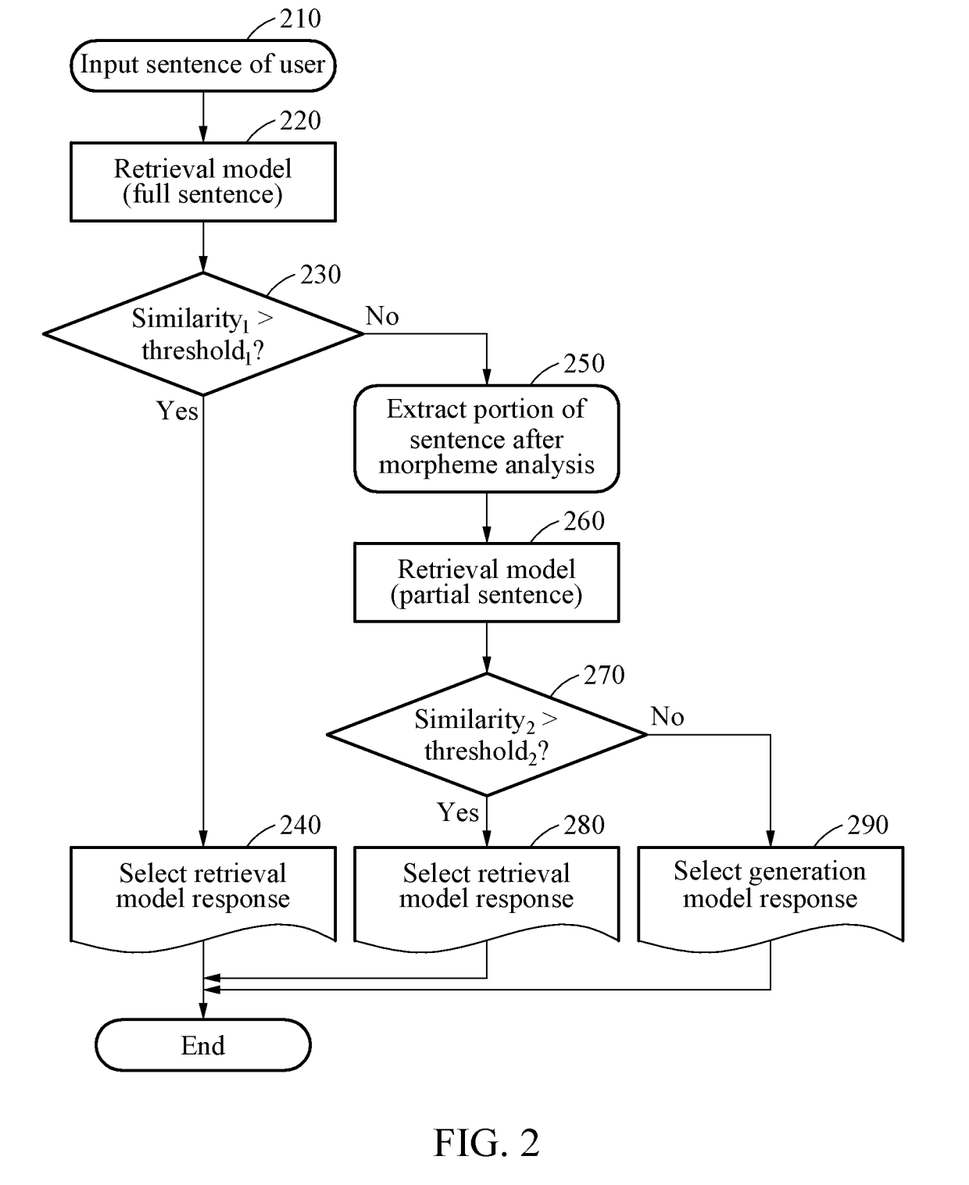
FIGS. 2 and 3 illustrate example processes of determining a response sentence using a retrieval model and a generation model, according to respective one or more embodiments.
Figure 3:
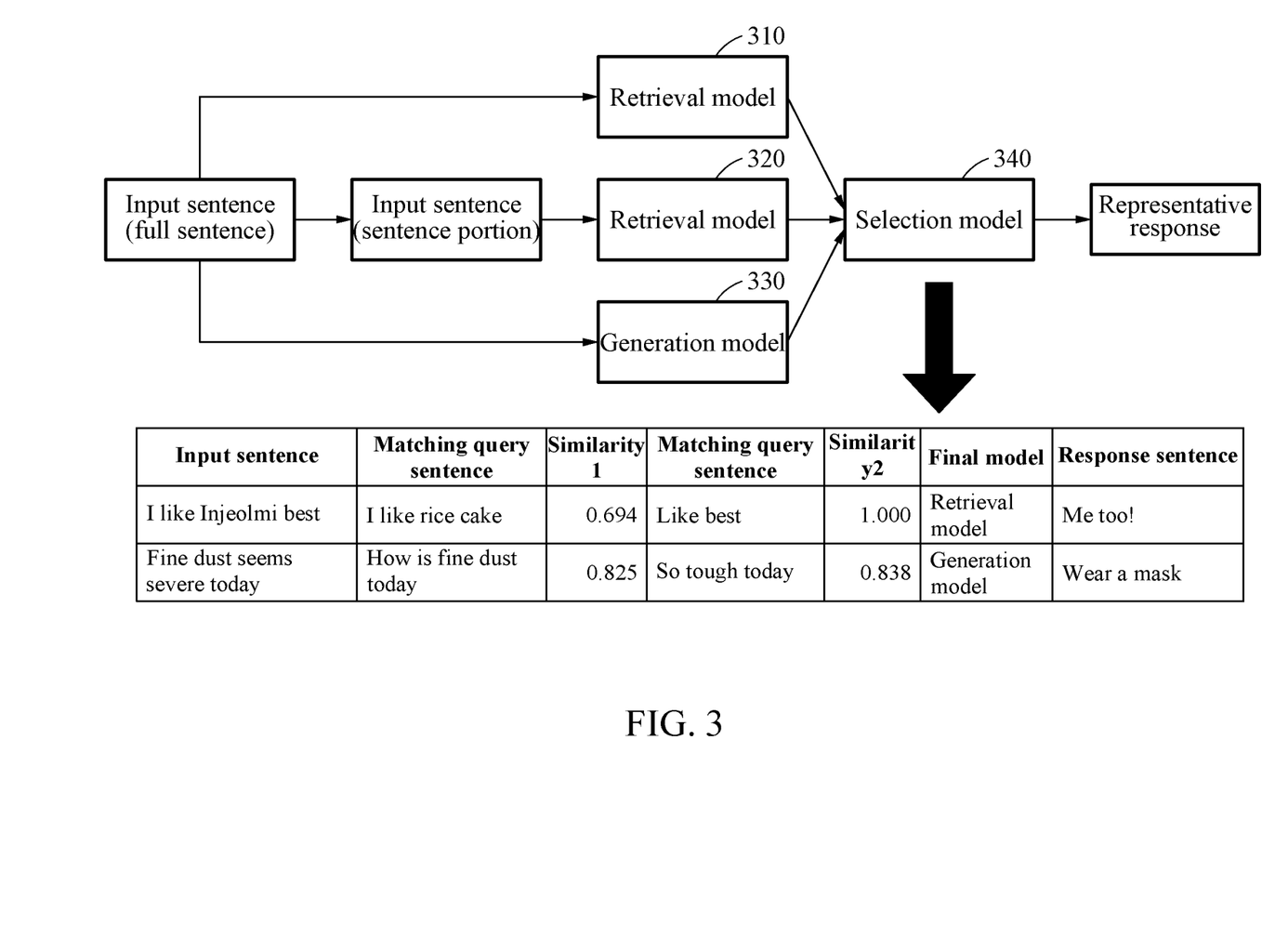

FIGS. 2 and 3 illustrate example processes of determining a response sentence using a retrieval model and a generation model, according to respective one or more embodiments.

FIG. 2 is a flowchart illustrating a process of determining a response sentence in a natural language processing apparatus, e.g., an apparatus with natural language processing among other features and functions.

In operation 210, the natural language processing apparatus may receive an input sentence from a user. For example, the input sentence may be acquired from a speech signal uttered by the user or text data input by the user. The natural language processing apparatus may receive the speech signal uttered by the user and determine the input sentence. Also, the natural language processing apparatus may receive the input sentence from the user through a text input. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

In operation 220, the natural language processing apparatus determines a similarity between the full input sentence of the user and each of a plurality of query sentences stored in a database of a retrieval model. The natural language processing apparatus may determine when the sentence is complete or full, such as based on speech pauses, inflections, or other analysis mechanism of the features of captured speech, for example. In addition, the term 'sentence' herein is intended to refer grammatically complete sentences as well as partial sentences or phrases of two or more words, for example, noting that a 'partial sentence' or 'portion of a sentence' may include one or more words. In an example, the similarity is a cosine similarity between an embedding vector of the full input sentence, e.g., as generated by the encoder of FIG. 1, and each of the embedding vectors of the query sentences, e.g., as stored in the embedding database of FIG. 1. In this example, through the respective similarity considerations, a first query sentence having a highest similarity may be identified/determined, and the corresponding similarity determined to be a first similarity.

In operation 230, the natural language processing apparatus determines whether the first similarity is greater than, or meets, a first threshold. When the first similarity is greater than, or meets, the first threshold, operation 240 is performed. When the first similarity is less than, or fails to meet, the first threshold, operation 250 is performed. In a case in which the first similarity is equal to the first threshold, operation 240 may be performed in one example, or in another example operation 250 may be performed.

In operation 240, the natural language processing apparatus selects the first response sentence corresponding to the first query sentence in the embedding database, for example, and outputs the selected first response sentence as a response to the input sentence. For example, the natural language processing apparatus may generate an artificial voice with the first response sentence and output the generated artificial voice through a speaker, and/or the natural language processing apparatus may display the first response sentence in a form of text on a display of the natural language processing apparatus.

In operation 250, the natural language processing apparatus extracts a portion of the input sentence by performing a morpheme analysis on the input sentence.

Through the morpheme analysis, the input sentence may be divided based on morphemes, which are minimum semantic units, and separated into one or more sentence components. Still further, the full sentence may be input through text, or further may result from a translation operation through a translation model. For example, a Korean language input sentence "월드컵 끝나서 슬퍼" may be separated into "월드컵/NNG", "끝/NNG", "나/NP", "서/JKB", and "슬퍼/VA+EC" through the morpheme analysis. Here, NNG denotes a common noun, NP denotes pronouns, JKB denotes an adverbial case marker, VA denotes an adjective, and EC denotes a connecting ending. In another example of Korean language, an input sentence "바지가 안 들어가" may be separated into "바지/NNG", "가/JKS", "안/MAG", and "들어가/VV+EC" through the morpheme analysis. Here, JKS denotes a subject case marker, MAG denotes a general adverb, and VV denotes a verb.

One of the components included in the input sentence may, thus, be extracted as a portion of the input sentence. The portion of the input sentence is a sentence component corresponding to a type of task for processing the input sentence. The type of task includes, for example, a chatbot type and a retrieval type. In a case of a chatbot task type, e.g., performing a purpose-oriented conversation or a daily conversation, a verb may extracted from the components included in the input sentence as the portion of the input sentence. In a case of a retrieval task type, e.g., using a search engine, a noun may be extracted from the components included in the input sentence as the portion of the input sentence. Thus, depending on a determined type of task to be performed, or that is currently being performed, the resulting portion of the input sentence may include a verb of the input sentence or the resulting portion of the input sentence may include a noun of the input sentence.

Also, a component may be extracted from the components included in the input sentence in a predetermined order, e.g., depending on their respective determined existences in the input sentence. As a non-limiting example, the extraction order may be a verb, a noun, and then an adjective/adverb, a verb may be extracted first from the components included in the input sentence. If no verb is extracted, a noun may be extracted. If no noun is extracted, an adjective and/or adverb may be extracted in turn.

In operation 260, the natural language processing apparatus determines a similarity between the portion of the input sentence of the user and each of the plurality of query sentences stored in a database of the retrieval model. For example, the similarity may be a cosine similarity between an embedding vector of the portion of the input sentence, e.g., as generated by the encoder of FIG. 1, and an embedding vector of each of the query sentences stored in an embedding database, such as the embedding database demonstrated above in FIG. 1. In this process, a found second query sentence having a highest similarity may be identified, and the corresponding similarity is determined to be a second similarity. The second query sentence may end up being the same as or different from the first query sentence.

In operation 270, the natural language processing apparatus determines whether the second similarity is greater than, or meets, a second threshold. When the second similarity is greater than, or meets, the second threshold, operation 280 is performed. When the second similarity is less than, or fails to meet, the second threshold, operation 290 is performed. In a case in which the second similarity is equal to the second threshold, an example exists where operation 280 is performed and an example exists where operation 290 is performed.

In operation 270, whether a third similarity between the embedding vector of the full input sentence and the found embedding vector of the second query sentence is greater than, or meets, a third threshold may be additionally determined. When the second query sentence, determined most similar to the portion of the input sentence, is thus not sufficiently similar (e.g., when the third similarity does not meet the third threshold) to the full input sentence, the second response sentence, e.g., as indicated in the embedding database of FIG. 1, corresponding to the second query sentence may not be appropriate as a response to the full input sentence. For example, when the third similarity meets the third threshold, operation 280 is performed, and when the third similarity fails to meet the third threshold, operation 290 is performed.

In operation 280, the natural language processing apparatus selects the second response sentence corresponding to the second query sentence in the database and outputs the selected second response sentence as a response to the full input sentence.

In operation 290, the natural language processing apparatus acquires a response sentence corresponding to the full input sentence from a generation model to which the full input sentence is input, and which outputs the generated response sentence. Here, as a non-limiting example, the generation model may be trained through conversational training data to generate a conversational output for a conversational input, for example. Thus, implementation of the generation model with respect to the full input sentence generates a response that can be output to the user, for example.

Referring to FIG. 3, retrieval models 310 and 320, a generation model 330, and a selection model 340 may be implemented by the natural language processing apparatus, e.g., by one or more processors of the natural language processing apparatus that store the respective models in memory of the natural language processing apparatus along with all or some related database information, as non-limiting examples. For example, a memory of the natural language processing apparatus may store instructions, which when executed by the one or more processors configure the one or more processors to implement the respective models and one or more or all operations described herein. The retrieval model 310 is configured to determine a response sentence by searching for and retrieving a query sentence most similar to a full input sentence from a database, such as discussed above with respect to FIGS. 1 and 2. The retrieval model 320 is configured to determine a response sentence by searching for and retrieving a query sentence most similar to a select portion of the input sentence from the database, for example. The generation model 330 is configured to generate a response sentence corresponding to the input sentence based on the full input sentence. As a non-limiting example, the generation model 330 may be neural network or other machine learning model. The selection model 340 may be configured to select between the respective response sentences determined in any combination of model responses, e.g., between the respective response sentences that may be determined by the retrieval model 310 and the retrieval model 320, or between the respective response sentences that may be determined by the retrieval model 310, the retrieval model 320, and the generation model 330. The selection model 340 may also determine what response sentence is available and/or appropriate according to the selective implementation of the respective models, or acquiring or generation of the respective responses, according to the flow diagram of FIG. 2, for example.

As an example, for an input sentence "I like Injeolmi best", the retrieval model 310 identifies a first query sentence "I like rice cake" as a most similar sentence to the full input sentence. In this example, since a first similarity between the input sentence "I like Injeolmi best" and the first query sentence "I like rice cake" is 0.694 and less than, or fails to meet, a first threshold of "0.85", the retrieval model 320 is also implemented or a corresponding found second query sentence result of the retrieval model 320 considered. The retrieval model 320 identifies the second query sentence "Like best" to be the most similar to a portion (for example, "like best" which is a verb component) of the input sentence. Since a second similarity between the portion "like best" of the input sentence and the second query sentence "Like best" is 1.000 and greater than, or meets, a second threshold of "0.9", a response sentence "Me too!" corresponding to the second query sentence "Like best" is selected as a response to be output to the user.

As another example, for an input sentence "Fine dust seems severe today", the retrieval model 310 identifies a first query sentence "How is fine dust today" as a most similar sentence to the full input sentence. In this example, since a first similarity between the input sentence and the first query sentence is 0.825 and less than, or fails to meet, the first threshold of "0.85", the retrieval model 320 is also implemented or a corresponding found second query sentence result of the retrieval model 320 considered. The retrieval model 320 identifies the second query sentence "So tough today" to be the most similar to a portion (for example, "seems severe" which is a verb component) of the input sentence. Since a second similarity between the portion "seems severe" of the input sentence and the second query sentence "So tough today" is 0.838 and less than, or fails to meet, the second threshold of "0.9", the generation model 330 is also implemented or a response sentence result of the generation model 330 considered. The generation model 330 generates a response sentence "Wear a mask" generated to correspond to the input sentence "Fine dust seems severe today" as a response to be output to the user. While the flow diagram of FIG. 2 demonstrates selective implementations of the retrieval model 320 and the generation model 330, one or both of the retrieval model 320 and the generation model 330 may be implemented in parallel with the implementation of the retrieval model 310, and the selection model 340 may operate as discussed above, such as to determine which response sentence to acquire or use with respect to the results of the retrieval model 310 and the retrieval model 320 and the generated response of the generation model 330, for outputting a response to the user's input sentence. In an example, two or more of the retrieval model 310, retrieval model 320, and generation model 330 may use the same encoder, e.g., the encoder of FIG. 1. The generation model 330 may also be implemented as a trained decoder, e.g., provided or receiving the output of the encoder of FIG. 1. As an alternative, or additional example, different respective encoders and/or decoders may be implemented by each of the retrieval model 310, retrieval model 320, and generation model 330 depending on a determined type of the input sentence, as discussed in greater detail further below. For example, the retrieval model 320 may use a first encoder/decoder combination of models for a first type of the full input sentence, and use a different second encoder/decoder combination of models for a second type of the full input sentence.

Figure 4:
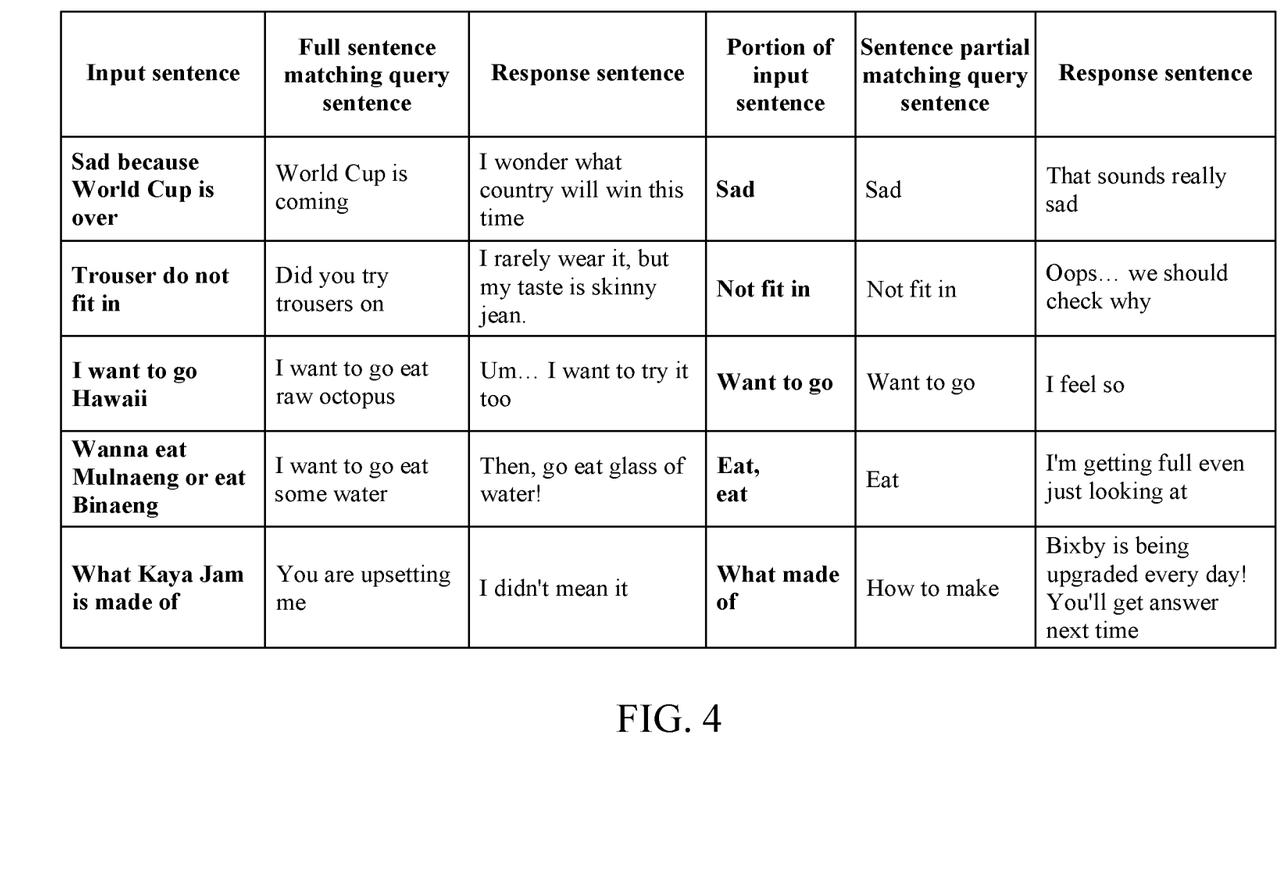
FIGS. 4 and 5 illustrate examples of determined response sentences, according to respective one or more embodiments.
Figure 5:
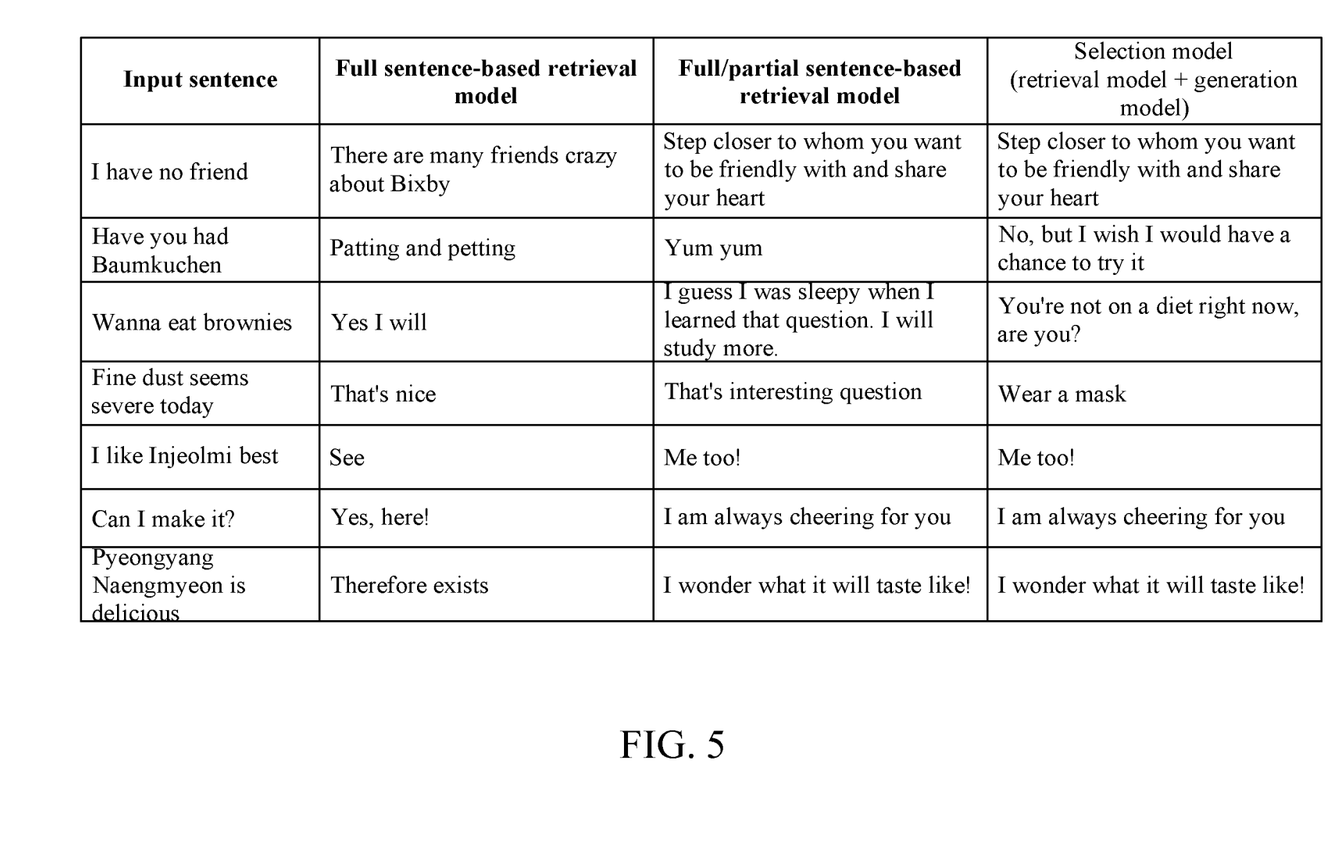

FIGS. 4 and 5 illustrate examples of determined response sentences, according to respective one or more embodiments.

FIG. 4 illustrates examples of query sentences and response sentences found matching respective full input sentences, and query sentences and response sentences found matching portions of the respective input sentences. For ease of description, a case in which a verb component is selected as a portion of an input sentence is demonstrated in the examples of FIG. 4. For example, since a database in practice may not include all possible matching query sentences for all possible input sentences, there may not be an identical stored query sentence in the database for an input sentence "Sad because World Cup is over", but rather the query sentence "World Cup is coming" may be selected as a most similar sentence to the full input sentence. For example, using the example of FIG. 1, an embedding database may store pairs of query embedding vectors and corresponding response sentences, and a search of the database with respect to a generated embedding vector of the full input sentence "Sad because World Cup is over" may result in the most similar stored query embedding vector corresponding to "World Cup is coming" being determined. In this example, a similarity between the input sentence "Sad because World Cup is over" and the found query sentence "World Cup is coming" may be insufficient, for example, an example similarity between the embedding vector of the full input sentence and the found query embedding vector correspond to "World Cup is coming" may be less than or equal to, or fails to meet, a first threshold. Thus, if the response sentence "I wonder what country will win this time" corresponding to the query sentence "World Cup is coming" were to be output as the response to the input sentence, this output response would not be an appropriate response to the input sentence "Sad because World Cup is over." Accordingly, a query sentence "Sad" may be found in the database as being a most similar sentence to a portion "sad" of the input sentence, e.g., stored query embedding vector for "Sad" may be found to be most similar for an embedding vector for the portion "sad" of the input sentence. Since a corresponding similarity between the query sentence "Sad" and the portion "sad" of the input sentence is sufficient, for example, greater than or equal to, or meets, a second threshold, the corresponding response sentence "That sounds really sad" paired with the query sentence "Sad" is output as a response to the input sentence "Sad because World Cup is over." Through this, a user may experience a natural chatbot conversation. As described in the examples of FIG. 4, when a similarity based on a full input sentence is not sufficient, an accurate response may be expected by determining a response sentence using a query sentence matching a portion of an input sentence.

FIG. 5 illustrates examples of respective response sentences determined for each of plural full input sentences, and respectively determined based on three different response determining approaches: using a first model approach that determines a response sentence using only the full input sentence, referred to in FIG. 5 as the "Full sentence-based retrieval model" and as an example relating to the response sentence determined by the retrieval model 310 of FIG. 3; using a second model approach that selectively determines the response sentence of the first model approach or the response sentence based on a partial or portion of the full input sentence provided to a retrieval model, referred to in FIG. 5 as the "Full/partial sentence-based retrieval model" and as an example relating to the selection between the response sentences of retrieval models 310 and 320 as discussed above with respect to FIG. 3; and using a third model approach that selectively determines the response sentence according to the second model approach or the response sentence generated by a generation model provided the full input sentence, referred to in FIG. 5 as the "Selection model (retrieval model+generation model)" and as an example relating to the selection between the response sentences of retrieval models 310 and 320 and the generation model 330 as discussed above with respect to FIG. 3.

Because a limited number of pairs of query sentences and corresponding response sentences are stored in a database used by a retrieval model, e.g., because of the limited number of pairs of query embedding vectors and corresponding response sentences in an embedding database, a stored query embedding vector having a sufficiently high similarity to an embedding vector of the full input sentence may not be found in the database, e.g., only a lesser similar query embedding vector may be found, and thus an inappropriate response sentence could be output if the corresponding found lesser similar query sentence was relied upon.

In this case, e.g., when the similarity between such a found query embedding vector and the embedding vector of the full input sentence fails to meet a predetermined first threshold, a query sentence having a high similarity may be searched and retrieved from the database based on a partial sentence component having a determined or inferred 'importance' meaning in the input sentence. Through this, an appropriate response sentence may be output based on the partial sentence component. However, if a query sentence cannot be found in the database having a sufficiently high similarity to the partial sentence, a generation model may be used to determine and output the response sentence for the full input sentence.

As demonstrated in FIG. 5, for example, for an input sentence "I have no friend", the full sentence-based retrieval model retrieves a most similar query sentence to the full input sentence and the natural language processing apparatus could output the response sentence "There are many friends crazy about Bixby" corresponding to a found query sentence. Because it is difficult to store all possible query sentences, or all possible query embedding vectors for all possible query sentences, to be referenced by a retrieval model in a database, when a query sentence having a low similarity with an input sentence is found or retrieved as a most similar query sentence, if the corresponding response sentence for that found or retrieved query sentence were output the user may feel awkward or uncomfortable with the natural language interaction of the natural language processing apparatus.

Thus, when a query sentence found based on the full input sentence has an insufficient similarity with the full input sentence, the full/partial sentence-based retrieval model performs a query sentence search again based on a portion of the input sentence. Because it is relatively easier to find a query sentence having a high similarity based on a portion of the input sentence than the full input sentence, a response sentence "Step closer to whom you want to be friendly with and share your heart" found to be the most similar to the portion of the input sentence may be output as a natural response to the input sentence, as demonstrated in FIG. 5.

However, as another example, as in a case of an input sentence "Have you had Baumkuchen", responses available for output based on a retrieval model using a portion of an input sentence, as well as a/the retrieval model using the full input sentence, may be determined to still not be sufficiently appropriate. In this example, the selection model (retrieval model+generation model) selects a response sentence "No, but I wish I would have a chance to try it" generated by the generation model as a natural response to the input sentence, and this generated response sentence is output.

Figure 6:
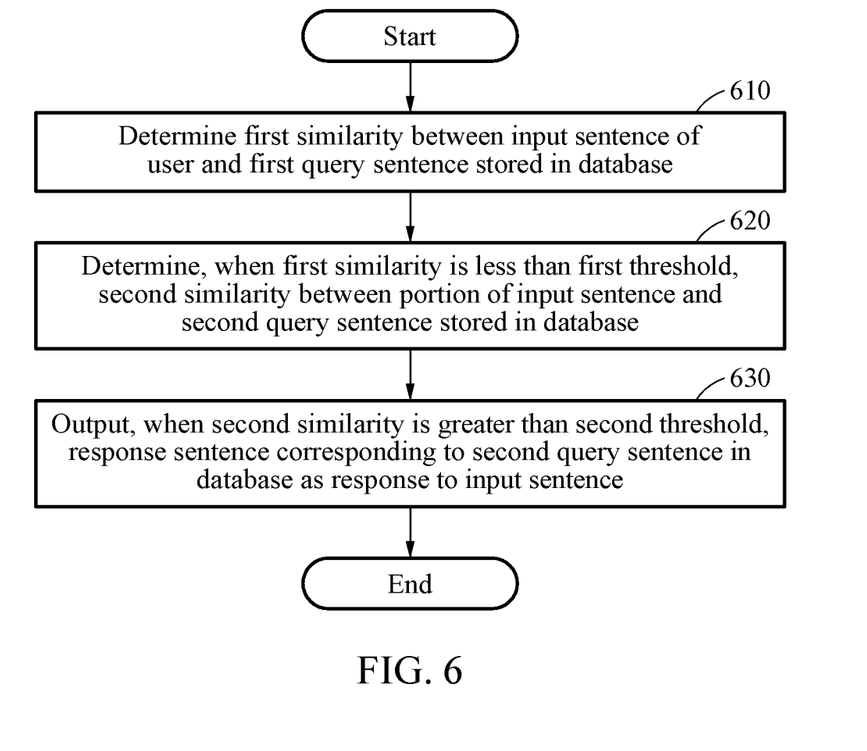
FIGS. 6 and 7 illustrate example natural language processing methods, according to respective one or more embodiments.
Figure 7:
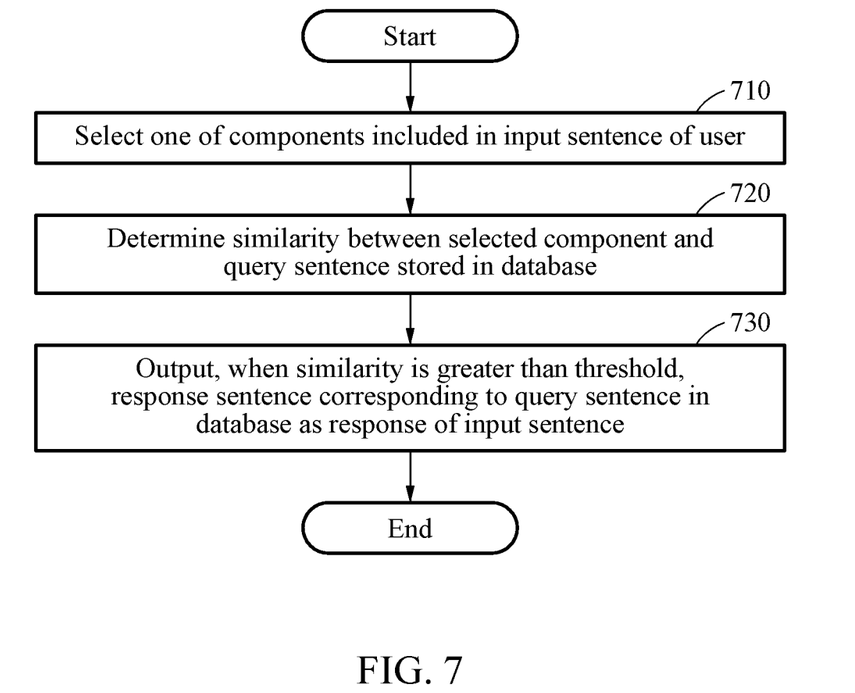

FIGS. 6 and 7 illustrate example natural language processing methods, according to respective one or more embodiments.

FIG. 6 illustrates an example of a natural language processing method performed by one or more processors included in a natural language processing apparatus, as a non-limiting example.

In operation 610, the natural language processing apparatus determines a first similarity between an input sentence of a user and a first query sentence stored in a database. The input sentence of the user is acquired from a speech signal uttered by the user or text data input by the user. As a non-limiting example, the input sentence may be encoded into an embedding space, and the first similarity may be determined between the input sentence in the embedding space and stored sentences or phrasings previously encoded into the embedding space, such as through comparisons of the embedding vector of the input sentence and respective embedding vectors of a multiple of the stored sentences or phrasings.

When the first similarity is greater than, or meets, a predetermined first threshold, the natural language processing apparatus outputs a response sentence, predetermined in the database as corresponding to the first query sentence, as a response to the speech signal.

In operation 620, when the first similarity is less than, or fails to meet, the first threshold, the natural language processing apparatus determines a second similarity between a select portion of the input sentence and a second query sentence stored in the database. The select portion of the input sentence may be one of plural components included in the input sentence. For example, the portion of the input sentence may, e.g., selectively, be a verb and/or a noun included in the input sentence. The portion of the input sentence may be a sentence component selected to correspond to a determined or set type of task processing for the input sentence. As non-limiting examples, the type of task processing may include a chatbot type and a retrieval type. As an example, the type of task may be determined by another model, e.g., by another neural network. As another example, if a user is using a browsing or information retrieval function of the natural language processing apparatus, or the user issues a command indication the user's intent for the same with respect to a next input sentence, the type of task may be determined to be a retrieval task, while if the user is using a conversational function or otherwise interacting with an application of the natural language processing apparatus, or the user issues a command indicating the same intent of the user for a next input sentence, the type of task may be determined to be a chatbot type. The portion of the input sentence may be selected from among all components of the input sentence by performing a morpheme analysis on the input sentence and selecting the component dependent on the result of the morpheme analysis. In non-limiting examples, the determining of the type of task and/or the morpheme analysis may be performed dependent on, or upon, the first similarity being determined to be less than, or failing to meet, the first threshold, and the portion of the input sentence selected based on results of at least the morpheme analysis, or both the determined task and the morpheme analysis.

In operation 630, when the second similarity is greater than, or meets, a predetermined second threshold, the natural language processing apparatus outputs a response sentence, predetermined in the database as corresponding to the second query sentence, as a response to the input sentence.

When the second similarity is less than, or fails to meet, the second threshold, the natural language processing apparatus generates a response sentence corresponding to the input sentence by implementing a generation model with respect to the input sentence, and outputs the response sentence generated by the generation model.

FIG. 7 illustrates another example of a natural language processing method performed by one or more processors included in a natural language processing apparatus, as a non-limiting example.

In operation 710, the natural language processing apparatus selects a component from components included in the input sentence. The natural language processing apparatus selects a component, from all components of the input sentence, corresponding to a determined or set type of task processing for which the input sentence is input, e.g., as discussed above. The natural language processing apparatus may, thus, select a different component from the components of the input sentence, by performing a morpheme analysis on the input sentence and dependent on the determined or set type of task, e.g., when the task type is determined to be a retrieval task type the selected component may be noun (or verb) of the input sentence, while when the task type is determined to be a chatbot type the selected component may be verb (or noun) of the input sentence. As another non-limiting example herein, a verb component may be respectively selected for both the retrieval task type and the chatbot type.

In operation 720, the natural language processing apparatus determines a similarity between the selected component and a query sentence stored in a database.

In operation 730, when the similarity is determined to be greater than, or meets, a predetermined threshold, the natural language processing apparatus outputs a response sentence corresponding to the query sentence in the database as a response of the input sentence.

When the similarity is less than, for fails to meet, the predetermined threshold, the natural language processing apparatus implements a generation model with respect to the input sentence that generates a response sentence corresponding to the input sentence. The generated response sentence by the generation model may then be output.

The description of FIGS. 1 through 5 is also applicable to operations of FIGS. 6 and 7, and thus, further repeated description thereof will be omitted.

Figure 8:
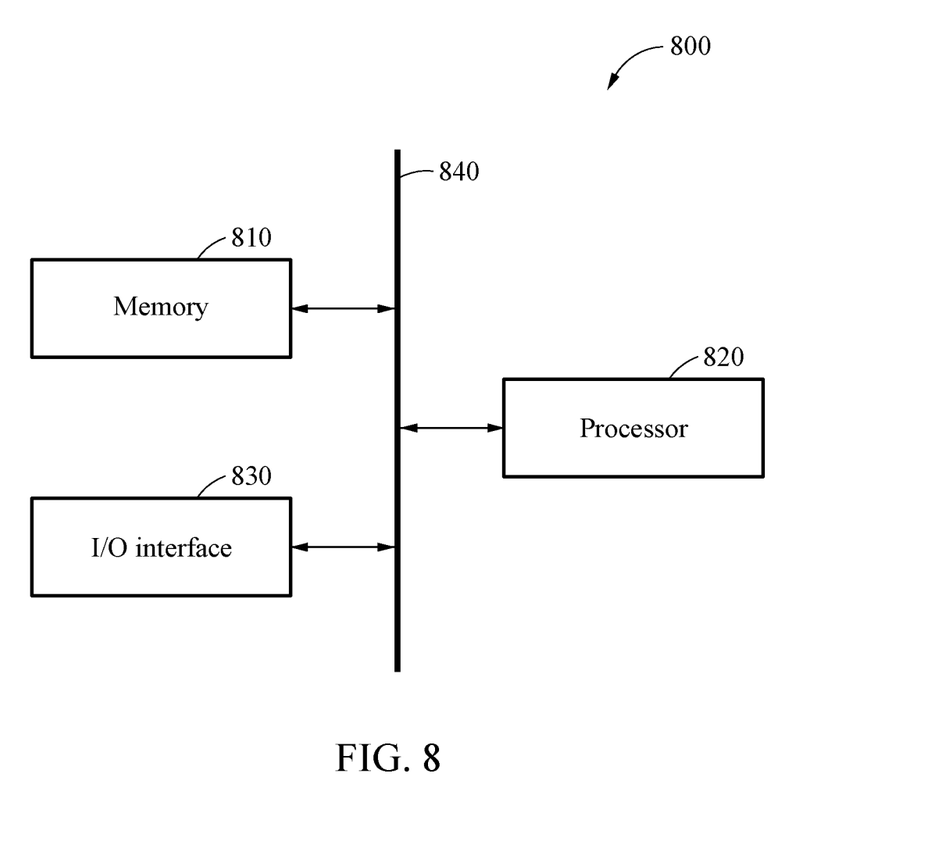
FIG. 8 illustrates an example of a natural language processing apparatus, according to one or more embodiments.

FIG. 8 illustrates an example of a natural language processing apparatus, according to one or more embodiments.

Referring to FIG. 8, a natural language processing apparatus 800 includes a memory 810, a processor 820, and an input and output (I/O) interface 830, as non-limiting examples. The memory 810, the processor 820, and the I/O interface 830 may communicate through a bus 840.

The memory 810 may include computer-readable instructions. The processor 820 may be configured to implement any, any combination, or all of the above-described operations depending on the instructions in the memory 810 being executed by the processor 820, for example. The memory 810 is a volatile memory or a non-volatile memory, or may include one or more volatile memories and/or one or more non-volatile memories.

The processor 820 is a hardware device, or a combination of hardware and instructions which configure the processor 820 based on execution of the instructions by the processor 820. The processor 820 may be further configured to execute other instructions, applications, or programs, or configured to control other operations of the natural language processing apparatus 800. The processor 820 includes, for example, a central processing unit (CPU), graphics processing unit (GPU), and/or other processor configured for implementing machine learning models. The natural language processing apparatus 800 may include, or be connected to an external device for example, a microphone and a keyboard as non-limiting examples, through (or represented by) the I/O interface 830, to receive or capture an input sentence of a user and/or output a response sentence through a speaker, e.g., as also connected to or represented by the I/O interface 830. The natural language processing apparatus 800 may be, or implemented as part of, various computing devices, for example, a smartphone, a wearable device, a personal digital assistant (PDA), a tablet computer, a laptop computer, a smart home appliance such as a smart television, a smart car, and a kiosk. In addition, the natural language processing apparatus 800 may be configured to perform all operations described above.

The apparatuses with natural language processing, the encoder, the decoder, the sentence database, the embedding database, the retrieval models, the generation models, the retrieval model 310, the retrieval model 320, the generation model 330, the selection model 340, the full sentence-based retrieval model, the full/partial sentence-based retrieval model, the selection model, the processors, the memories, the display, the keyboard, the speakers, the microphones, the I/O interface 830, the memory 810, and the processor 820, as well as the remaining apparatuses, units, modules, devices, and other components described herein, are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:
    determining a first similarity between an input sentence of a user and a select first database query sentence; and
    dependent on a determination that the first similarity fails to meet a first threshold,
        determining a second similarity between a portion of the input sentence, less than all of the input sentence, and a select second database query sentence, and
        in response to the second similarity meeting a second threshold, outputting a response sentence corresponding to the second database query sentence as a response to the input sentence.

2. The method of claim 1, further comprising encoding the input sentence into a first feature vector,
    wherein the determining of the first similarity includes determining a similarity between the first feature vector and the first database query sentence, the first database query sentence being a first query sentence feature vector stored in a database among a plurality of query sentence feature vectors stored in the database.

3. The method of claim 2, further comprising:
    dependent on the determination that the first similarity fails to meet the first threshold,
    encoding the portion of the input sentence into a second feature vector,
    wherein the determining of the second similarity includes determining a similarity between the second feature vector and the second database query sentence, the second database query sentence being a second query sentence feature vector stored in the database.

4. The method of claim 3, wherein the outputting of the response sentence corresponding to the second database query sentence includes decoding the second query sentence feature vector to obtain the response sentence.

5. The method of claim 1, wherein the portion of the input sentence is one component of plural components included in the input sentence.

6. The method of claim 5, wherein the portion of the input sentence is a verb, as the one component, included in the input sentence.

7. The method of claim 1, wherein the portion of the input sentence is a sentence component selected based on a type of task, of plural types of tasks, the input sentence corresponds to.

8. The method of claim 7, wherein the plural types of tasks comprise a chatbot type and a retrieval type.

9. The method of claim 1, wherein apportionment of the input sentence, to determine the portion of the input sentence, is based on a performed morpheme analysis for the input sentence.

10. The method of claim 1, further comprising:
outputting, based on the first similarity meeting the first threshold, a response sentence corresponding to the first query sentence as the response to the input sentence.

11. The method of claim 1, wherein the input sentence of the user is acquired from a speech uttered by the user or text data input by the user.

12. The method of claim 1, further comprising:
generating, when the second similarity fails to meet the second threshold, a response sentence corresponding to the input sentence using a generation model, and outputting the generated response sentence.

13. A non-transitory computer-readable storage medium storing instructions that, when executed by one or more processors, cause the one or more processors to perform the method of claim 1.

14. A processor-implemented method, the method comprising:
selecting a component from among all components included in an input sentence of a user;
determining a similarity between the component and a select database stored query sentence; and
selectively outputting, based on whether the similarity meets a threshold, a response sentence corresponding to the database stored query sentence as a response of the input sentence.

15. The method of claim 14, wherein the selecting of the component comprises:
selecting the component dependent on a determined type of task, of plural types of tasks, that the input sentence corresponds to.

16. The method of claim 15, further comprising:
determining the type of the task, wherein the plural types of the tasks include at least a chatbot type and retrieval type,
wherein the selecting of the component dependent on the determined type of the task includes selecting, based on a result of the determining of the type of the task, between a noun and verb of the input sentence to be the component selected from among all of the components included in the input sentence.

17. The method of claim 14, wherein the selecting of the component comprises:
performing a morpheme analysis on the input sentence; and
selecting the component dependent on a result of the performed morpheme analysis.

18. The method of claim 14, further comprising:
generating, when the similarity fails to meet the threshold, a response sentence corresponding to the input sentence using a generation model, and outputting the generated response sentence as the response of the input sentence.

19. The method of claim 14, further comprising encoding the component into a first feature vector,
wherein the determining of the similarity includes determining a similarity between the first feature vector and a component feature vector stored in a database among a plurality of component feature vectors stored in the database.

20. The method of claim 14, further comprising determining whether to perform the selecting of the component, the determining of the similarity, and the selective outputting based on whether an initial similarity determination, between an encoding result of the input sentence and select stored database query encoding results, meets an initial threshold.

21. The method of claim 19, wherein, when the similarity between the first feature vector and the component feature vector meets the threshold, the selective outputting of the response sentence corresponding to the database stored query sentence includes decoding the first feature vector and outputting the decoded first feature vector as the response sentence.

22. A non-transitory computer-readable storage medium storing instructions that, when executed by a processor, cause the processor to perform the method of claim 14.

23. An apparatus, the apparatus comprising:
one or more processors configured to:
determine a first similarity between an input sentence of a user and a select first database query sentence; and
dependent on a determination that the first similarity fails to meet a first threshold,
determine a second similarity between a portion of the input sentence, less than all of the input sentence, and a select second database query sentence, and
in response to the second similarity meeting a second threshold, output a response sentence corresponding to the second database query sentence as a response to the input sentence.

24. The apparatus of claim 23, wherein the portion of the input sentence is one component of plural components included in the input sentence.

25. The apparatus of claim 24, wherein the portion of the input sentence is a verb, as the one component, included in the input sentence.

26. The apparatus of claim 23, wherein the portion of the input sentence is a sentence component selected based on a type of task, of plural types of tasks, the input sentence corresponds to.

27. The apparatus of claim 26, wherein the plural types of tasks comprise a chatbot type and a retrieval type.

28. The apparatus of claim 23, wherein apportionment of the input sentence, to determine the portion of the input sentence, is based on a performed morpheme analysis for the input sentence.

* * * * *